US008682536B2

(12) United States Patent
Takahashi et al.

(10) Patent No.: US 8,682,536 B2
(45) Date of Patent: Mar. 25, 2014

(54) ONBOARD UNIT CONTROLLING APPARATUS

(75) Inventors: Akio Takahashi, Wako (JP); Shinsuke Ueda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 501 days.

(21) Appl. No.: 12/817,317

(22) Filed: Jun. 17, 2010

(65) Prior Publication Data

US 2010/0324779 A1 Dec. 23, 2010

(30) Foreign Application Priority Data

Jun. 18, 2009 (JP) ................................. 2009-145592

(51) Int. Cl.
*G06F 7/00* (2006.01)
(52) U.S. Cl.
USPC .............................. 701/49; 701/36; 340/435
(58) Field of Classification Search
USPC ............... 701/49, 36; 359/877; 351/209, 210; 340/435
See application file for complete search history.

(56) References Cited

U.S. PATENT DOCUMENTS

| 4,158,483 A * | 6/1979 | Fisher et al. ................... 359/876 |
| 6,198,995 B1 * | 3/2001 | Settles et al. ................. 701/29.1 |
| 6,282,495 B1 * | 8/2001 | Kirkhart et al. ............... 701/490 |
| 6,384,852 B1 * | 5/2002 | Ye et al. ........................ 715/867 |
| 6,397,137 B1 * | 5/2002 | Alpert et al. ..................... 701/49 |
| 6,668,221 B2 * | 12/2003 | Harter et al. ..................... 701/36 |
| 7,652,583 B2 * | 1/2010 | Sanchez et al. ................ 340/575 |
| 2003/0023353 A1 * | 1/2003 | Badarneh .......................... 701/1 |
| 2003/0181822 A1 * | 9/2003 | Victor ............................ 600/558 |
| 2004/0150514 A1 * | 8/2004 | Newman et al. ............... 340/435 |
| 2005/0247549 A1 * | 11/2005 | Wahl et al. ................. 200/61.54 |
| 2009/0318069 A1 * | 12/2009 | Konet ............................. 454/155 |
| 2010/0256850 A1 * | 10/2010 | Sakata ............................ 701/22 |

FOREIGN PATENT DOCUMENTS

| JP | 08-058302 | 3/1996 |
| JP | 2007-038790 | 2/2007 |
| JP | 2007-302116 | 11/2007 |
| JP | 2010-105417 | 5/2010 |
| WO | WO 2009069612 A1 * | 6/2009 |

* cited by examiner

*Primary Examiner* — Fadey Jabr
*Assistant Examiner* — Thomas Ingram
(74) *Attorney, Agent, or Firm* — Rankin, Hill & Clark LLP

(57) ABSTRACT

When an occupant's sight line detected by sight line detector is directed to any one of multiple onboard units (a side mirror, a rear view mirror, a navigation system, an in-vehicle phone, an air blowout port, and a meter panel), a controller allows the onboard unit, to which the sight line is directed, to be operable. Thus, the occupant can select the onboard unit, which the occupant wishes to operate, by the sight line without using the hand and further can operate the onboard unit by use of a common steering switch, thereby enhancing the convenience of operation. In addition, a corresponding one of pilot lamps notifies the occupant that the corresponding one of the onboard units, to which the sight line is directed, is operable. Accordingly, the occupant can avoid operating a wrong onboard unit while reliably recognizing the operable onboard unit even if the multiple onboard units are arranged close to one another.

10 Claims, 18 Drawing Sheets

ONBOARD UNIT CONTROLLING APPARATUS

BACKGROUND OF THE INVENTION

1. Field of the Invention

The present invention relates to an onboard unit controlling apparatus including: a plurality of onboard units operable by an occupant; sight line detecting means configured to detect a sight line of the occupant; and control means configured such that, when the sight line of the occupant detected by the sight line detecting means is directed to any one of the plurality of onboard units, the control means turns the onboard unit, to which the sight line is directed, into an operable state.

2. Description of the Related Art

Japanese Patent Application Laid-open No. 2007-38790 discloses an apparatus that adjusts the direction of each of the left and right side mirrors of an automobile. In this publication the apparatus is configured to: capture an image of an occupant's face by use of a camera; judge which of the left and right side mirrors the occupant turns the face to; adjust the left side mirror upward, downward, leftward or rightward when the occupant utters "upward," "downward," "leftward," "rightward" or the like with the face facing the left side mirror; and adjust the right side mirror upward, downward, leftward or rightward when the occupant utters "upward," "downward," "leftward," "rightward" or the like with the face facing the right side mirror.

Incidentally, an automobile is equipped with multiple onboard units such as side mirrors, a rear view mirror, a navigation system, a hand-free in-vehicle phone, an air blowout port of an air conditioner and a meter panel. Each of the onboard units is designed to be operated by a corresponding one of switches. However, when each of the multiple onboard units is operated by the corresponding switch, a large number of switches are required, which in turn causes problems that securing installation spaces for switches is difficult, and that operations of the switches are troublesome.

The above-mentioned problem can be solved if the number of switches is reduced by providing a single common switch capable of operating the multiple onboard units such that the switch operates any of the onboard units which an occupant wishes to operate, in response to an event where the occupant looks at the onboard unit.

However, in the above case, if the multiple onboard units are arranged close to one another, the occupant cannot judge which onboard unit can be operated now by the switch. As a result, the occupant may mistakenly operate an onboard unit different from the onboard unit which the occupant wishes to operate.

SUMMARY OF THE INVENTION

The present invention has been made in view of the foregoing situation, and an object of the present invention is to reliably prevent a common switch from mistakenly operating one of mutually-adjacent onboard units when the common switch takes a role of operating multiple onboard units.

In order to achieve the object, according to a first feature of the present invention, there is provided an onboard unit controlling apparatus including: a plurality of onboard units that may be operated by an occupant; sight line detecting means configured to detect a sight line of the occupant; control means configured such that, when the sight line of the occupant detected by the sight line detecting means is directed to any one of the plurality of onboard units, the control means turns the onboard unit, to which the sight line is directed, into an operable state; and notice means configured such that, when the control means judges that the onboard unit, to which the sight line is directed, is operable, the notice means notifies the occupant of the onboard unit.

According to the configuration of the first feature, when the occupant's sight line detected by the sight line detecting means is directed to any one of the multiple onboard units, the control means allows the onboard unit, to which the sight line is directed, to be operable. Thus, the occupant can select the onboard unit which the occupant wishes to operate without using the hand. This enhances the convenience of the occupant or operator. In addition, the notice means informs the occupant that the onboard unit, to which the sight line is directed, is operable. Accordingly, the occupant can avoid operating a wrong onboard unit while reliably recognizing the operable onboard unit even if the multiple onboard units are arranged close to one another.

According to a second feature of the present invention, in addition to the first feature, the notice means are luminous bodies each of which is provided to a corresponding one of the onboard units, and each of which is configured to emit light when the corresponding onboard unit is operable.

According to the configuration of the second feature, the notice means are luminous bodies, each of which is provided to a corresponding one of the onboard units, and each of which emits light when the onboard unit is operable. This makes it possible for the occupant to reliably recognize the operable onboard unit.

According to a third feature of the present invention, in addition to the first and/or second feature, the operable onboard unit is controlled by a steering switch installed in a steering wheel, and a function of the steering switch is switched depending on the operable onboard unit.

According to the configuration of the third feature, any one of the operable onboard units is operated by the steering switch installed in the steering wheel. Thus, the occupant can operate the onboard unit without releasing the hands from the steering wheel. This enhances the convenience of the operator/occupant. Furthermore, because the functions of the steering switch are switched from one to another depending on the operable onboard unit, the occupant can operate the multiple onboard units by the common steering switch. This helps to reduce the number of installation spaces and component parts, and to improve the operability.

According to a fourth feature of the present invention, there is provided the onboard unit controlling apparatus according to any one of the first to third features, further comprising run judging means configured to judge whether or not a vehicle is running, wherein when any one of the onboard units is continuously operable for a predetermined time or longer and if the run judging means judges that the vehicle is running, the control means releases the one of the onboard units from the operable state, and concurrently operates the notice means in a mode different from a mode in the operable state.

According to the configuration of the fourth feature, while the vehicle is running, if any one of the onboard units continues to be operable longer than a predetermined time, the operable state of one onboard unit is cancelled. Thus, the occupant can avoid a mistake of not paying sufficient attention to the front view, the mistake made by fixing the sight line to one onboard unit for a long time. Moreover, the operation mode of the notice means changes once the operable state of the onboard unit is cancelled. Thus, the occupant can reliably recognize when the onboard unit becomes inoperable.

Here, a side mirror 21, a rear view mirror 22, a navigation system 23, an in-vehicle phone 24, an air blowout port 25, and a meter panel 26 of embodiments correspond to the onboard unit of the present invention; pilot lamps 21a, 22a, 23a, 24a, 25a, and 26a of the embodiments correspond to the notifying device or luminous bodies of the present invention; and an electronic control unit U of the embodiments corresponds to the controller of the present invention.

The above description, other objects, characteristics and advantages of the present invention will be clear from the following detailed descriptions, which will be provided hereinafter with reference to the attached drawings.

DESCRIPTION OF THE PREFERRED EMBODIMENT

Now, a first embodiment of the present invention will be described below based on FIGS. 1 to 18.

Figure 1:
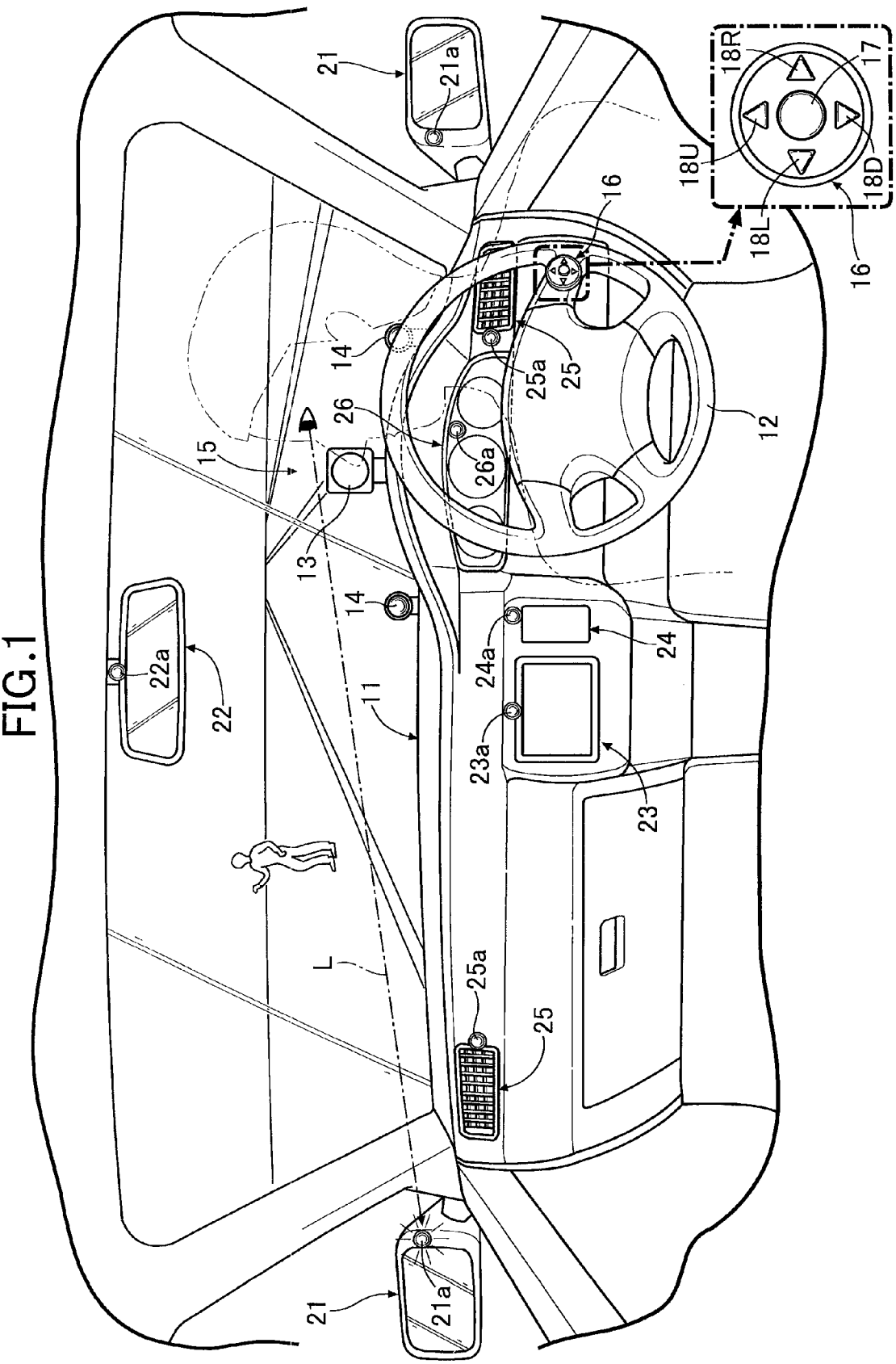
FIG. 1 is a view showing a front part of a vehicle compartment of an automobile.

As shown in FIG. 1, a steering wheel 12 is placed in the right of an instrumental panel 11 of an automobile. A near-infrared camera 13 and pair of near-infrared LEDs 14, 14 are installed on the instrumental panel 11 in front of the steering wheel 12. The pair of near-infrared LEDs 14, 14 are respectively situated on the left and right sides of the near-infrared camera 13. The near-infrared camera 13 and the near-infrared LEDs 14, 14 serve as a sight line detector 15 configured to detect a direction in which an occupant casts the sight line L.

The sight line detector 15 is configured as follows. The pair of near-infrared LEDs 14, 14 emit their respective beams of near-infrared light. An image of a reflecting point on each eyeball off which the beams of near-infrared light is reflected and the center of the pupil of each eyeball is captured by the near-infrared camera 13. Thereby, the sight line detector 15 is capable of detecting the direction of the occupant's sight line L based upon the location of the reflecting point and the location of the center of the pupil.

Onboard units in this embodiment include: left and right side mirrors 21, 21 installed on outer surfaces of the left and right front doors of the automobile; a rear view mirror 22 installed in an upper portion of a front window shield at the center of the vehicle width direction; a navigation system 23 and a hand-free in-vehicle phone 24 installed at the center of the instrumental panel 11 in the vehicle width direction; left and right air blowout ports 25, 25 of an air conditioner installed in two ends of the instrumental panel 11 in the vehicle width direction; and a meter panel 26 installed in the instrumental panel 11 in front of the steering wheel 12.

The onboard units such as the side mirrors 21, 21, the rear view mirror 22, the navigation system 23, the in-vehicle phone 24, the air blowout ports 25, 25 and the meter panel 26 are provided with their respective pilot lamps 21a, 21a, 22a, 23a, 24a, 25a, 25a and 26a. These pilot lamps serve as notifying devices and are installed in or around their respective onboard units.

A steering switch 16 is installed in the steering wheel 12. The occupant can operate the steering switch 16 without releasing the hands from the steering wheel 12. The steering switch 16 includes: a determination switch 17 situated at the center of the steering switch 16; an upper selection switch 18U placed above the determination switch 17; a lower selection switch 18D placed under the determination switch 17; a left selection switch 18L placed in the left of the determination switch 17; and a right selection switch 18R placed in the right of the determination switch 17.

Figure 2:
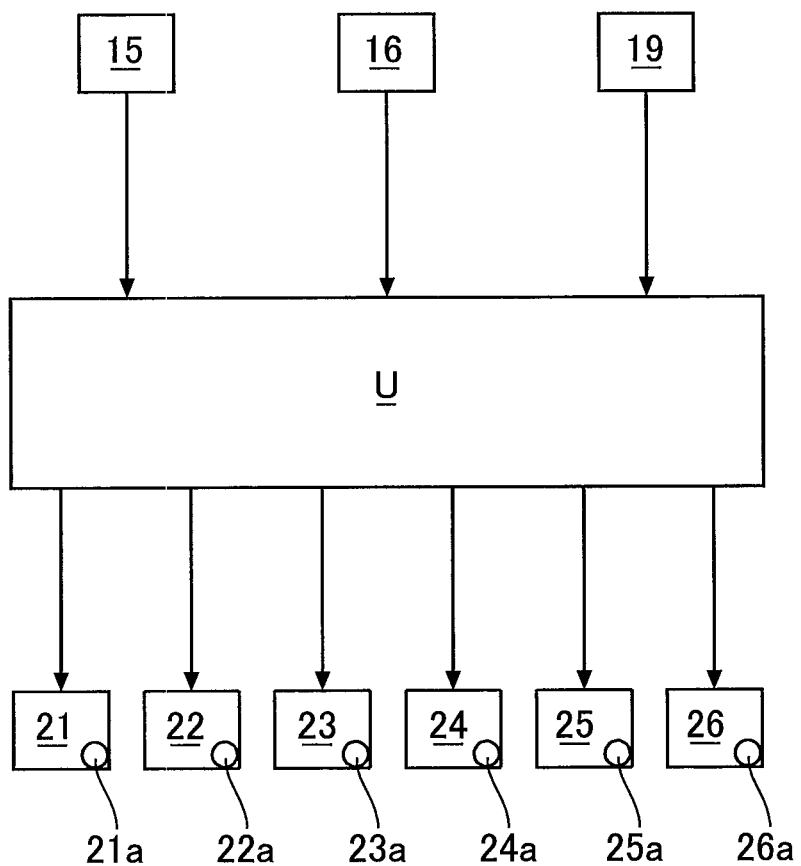
FIG. 2 is a block diagram of a control system of an onboard unit controlling apparatus.

As shown in FIG. 2, the sight line detector 15 configured to detect the direction of the occupant's sight line, the steering switch 16 installed in the steering wheel 12, a vehicle speed detector 19 configured to detect a vehicle speed of the subject vehicle (the vehicle speed detector 19 will be used in a second embodiment), the onboard units 21 to 26, and their pilot lamps 21a, 21a, 22a, 23a, 24a, 25a, 25a, 26a are connected to an electronic control unit U (i.e., a controller) of an onboard unit controlling apparatus.

Next, descriptions will be provided for an operation of the first embodiment of the present invention having the above-described configuration.

The steering switch 16 is commonly used to operate the multiple onboard units including the side mirrors 21, 21, the rear view mirror 22, the navigation system 23, the in-vehicle phone 24, the air blowout ports 25, 25, and the meter panel 26. One onboard unit is activated at a time. The activated onboard unit is operated by the steering switch 16. The activation of any one onboard unit is achieved by use of the occupant's sight line. In other words, for example, if the occupant pressed down the determination switch 17 of the steering switch 16 when the sight line detector 15 detects that the occupant looks at the left side mirror 21, the pilot lamp 21a of the left side mirror 21 is turned on, and thus notifies or informs the occupant that the left side mirror 21 becomes adjustable. If the occupant presses down the upper selection switch 18U, the lower selection switch 18D, the left selection switch 18L or the right selection switch 18R of the steering switch 16 while the pilot lamp 21a is emitting light, the direction in which the left side mirror 21 faces can be adjusted arbitrarily. Once the occupant presses down the determination switch 17 of the steering switch 16 after completing adjusting the direction of the left side mirror 21, the pilot lamp 21a is turned off, and thus notifying or informing the occupant that the left side mirror 21 is no longer adjustable.

Next, descriptions will be provided for the above-described operation on the basis of a flowchart.

Figure 3:
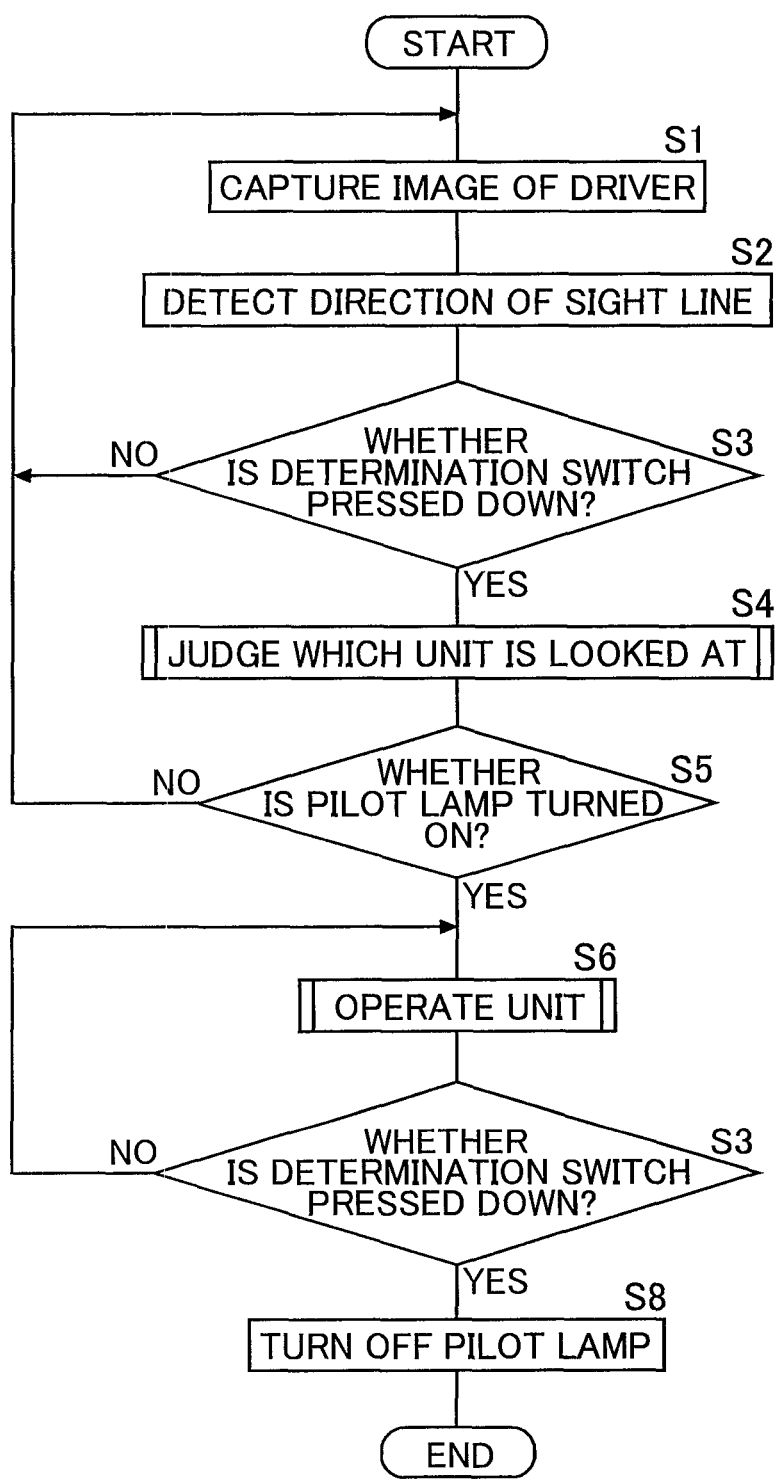
FIG. 3 is a flowchart of a main routine.

In the flowchart of a main routine shown in FIG. 3, the sight line detector 15 captures an image of the occupant in step S1, and detects the direction of the occupant's sight line L in step S2. If the occupant presses down the determination switch 17 of the steering switch 16 while looking at a particular onboard unit which the occupant wishes to operate in step S3, then the onboard unit the occupant looks at is judged in step S4. Once the pilot lamp of the onboard unit is turned on and the onboard unit becomes operable in step S5, the occupant operates the onboard unit by pressing down: the determination switch 17 of the steering switch 16; and the upper selection switch 18U, the lower selection switch 18D, the left selection switch 18L or the right selection switch 18R of the steering switch 16 in step S6. Thereafter, once the occupant presses down the determination switch 17 of the steering switch 16 in step S7, the pilot lamp is turned off and the routine is terminated in step S8.

Figure 4:
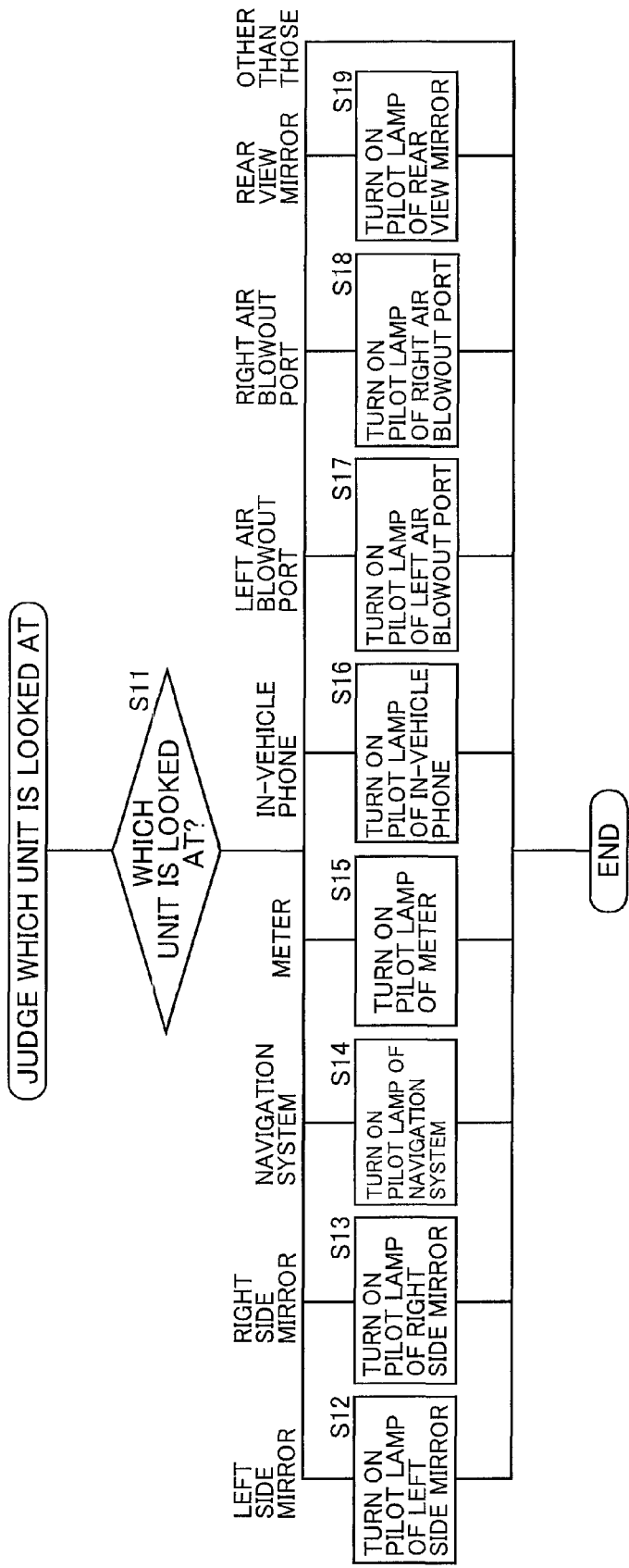
FIG. 4 is a flowchart of a sub-routine in step 4 of the flowchart in FIG. 3.

FIG. 4 shows a sub-routine (for judging which unit is looked at) of the step S4. While the left side mirror 21 is looked at in step S11, once the determination switch 17 is pressed down in step S12, the pilot lamp 21a of the left side mirror 21 is turned on. While the right side mirror 21 is looked at in step S11, once the determination switch 17 is pressed down in step S13, the pilot lamp 21a of the right side mirror 21 is turned on. While the navigation system 23 is looked at in step S11, once the determination switch 17 is pressed down in step S14, the pilot lamp 23a of the navigation system 23 is turned on. While the meter panel 26 is looked at in step S11, once the determination switch 17 is pressed down in step S15, the pilot lamp 26a of the meter panel 26 is turned on. While the in-vehicle phone 24 is looked at in step S11, once the determination switch 17 is pressed down in step S16, the pilot lamp 24a of the in-vehicle phone 24 is turned on. While the left air blowout port 25 is looked at in step S11, once the determination switch 17 is pressed down in step S17, the pilot lamp 25a of the left air blowout port 25 is turned on. While the right air blowout port 25 is looked at in step S11, once the determination switch 17 is pressed down in step S18, the pilot lamp 25a of the right air blowout port 25 is turned on. While the rear view mirror 22 is looked at in step S11, once the determination switch 17 is pressed down in step S19, the pilot lamp 22a of the rear view mirror 21 is turned on.

Figure 5:
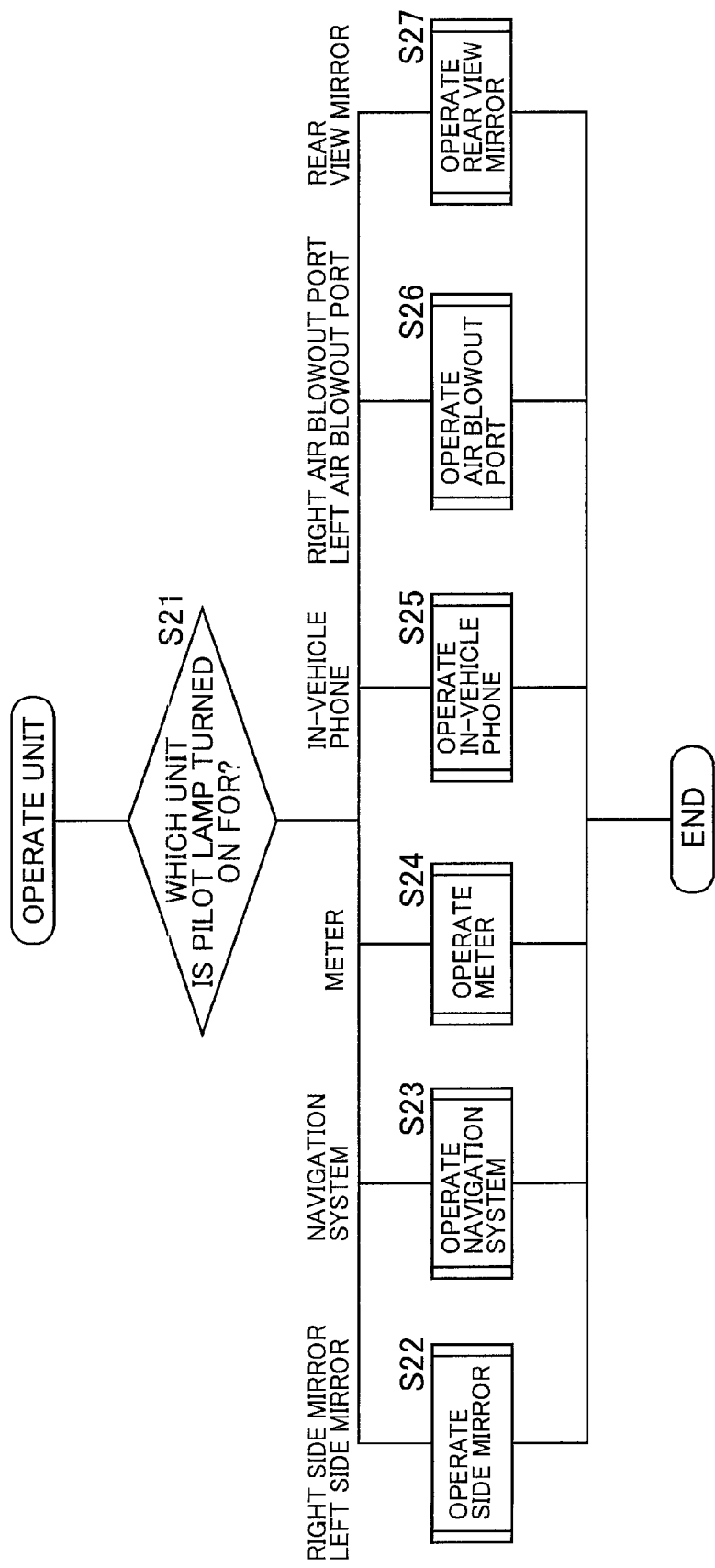
FIG. 5 is a flowchart of a sub-routine in step 6 of the flowchart in FIG. 3.

FIG. 5 shows a sub-routine of the step S6. While the pilot lamps 21a, 21a of the left and right side mirrors 21, 21 are on in step S21, the side mirrors 21, 21 can be operated by the steering switch 16 in step S22. While the pilot lamp 23a of the navigation system 23 is on in step S21, the navigation system 23 can be operated by the steering switch 16 in step S23. While the pilot lamp 26a of the meter panel 26 is on in step S21, the meter panel 26 can be operated by the steering switch 16 in step S24. While the pilot lamp 24a of the in-vehicle phone 24 is on in step S21, the in-vehicle phone 24 can be operated by the steering switch 16 in step S25. While the pilot lamps 25a, 25a of the left and right air blowout ports 25, 25 are on in step S21, the left and right air blowout ports 25, 25 can be operated by the steering switch 16 in step S26. While the pilot lamp 22a of the rear view mirror 22 is on in step S21, the rear view mirror 22 can be operated by the steering switch 16 in step S27.

Figure 6:
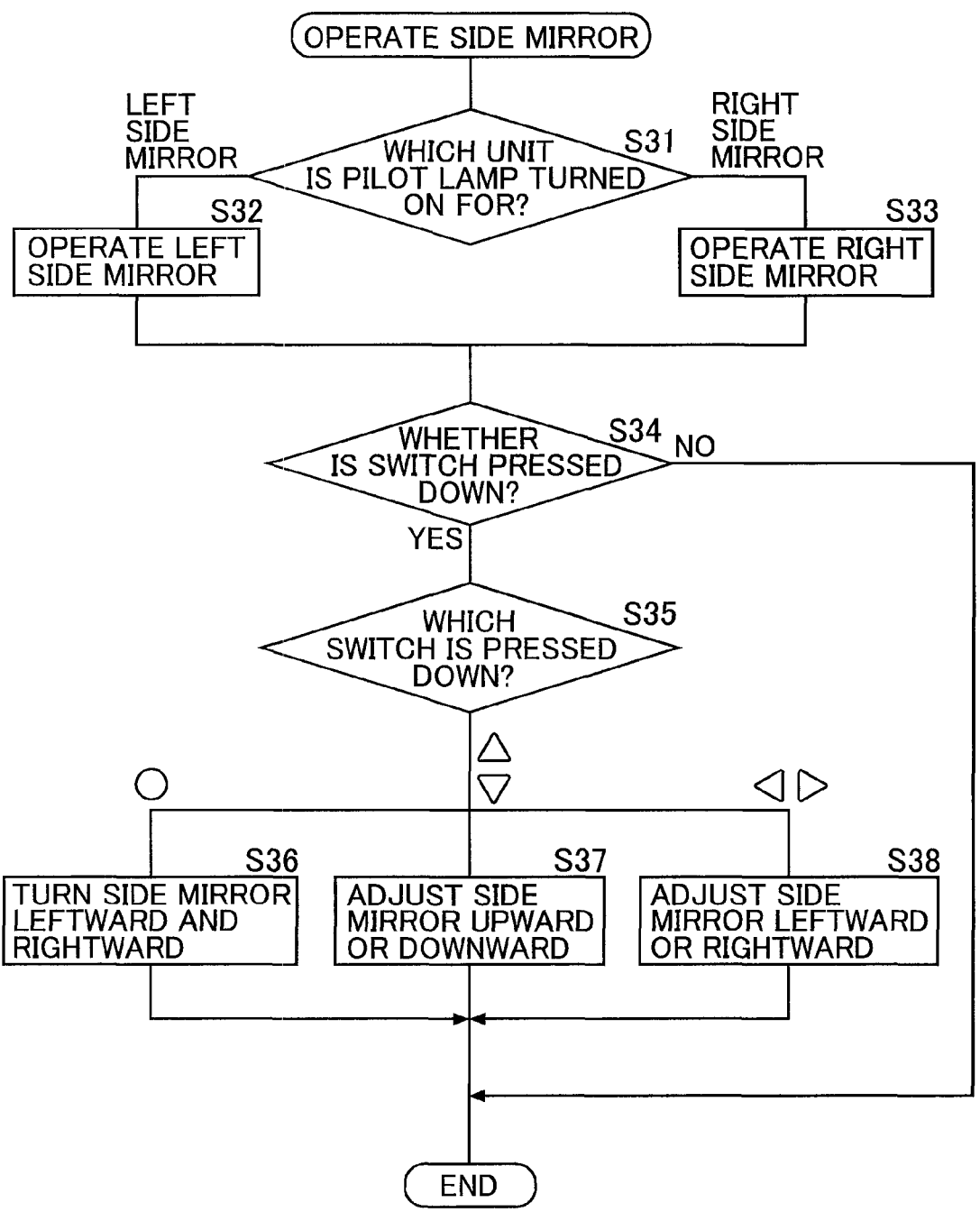
FIG. 6 is a flowchart of a sub-routine in step 22 of the flowchart in FIG. 5.

FIG. 6 shows a sub-routine (for operating the side mirrors) of the step S22. If an onboard unit for which the pilot lamp is judged as being turned on in step S31 is the left side mirror 21, the left side mirror 21 becomes operable in step S32. If an onboard unit for which the pilot lamp is judged as being turned on in step S31 is the right side mirror 21, the right side mirror 21 becomes operable in step S33. When the occupant presses down the steering switch 16 in step S34, if the switch is the determination switch 17 in step S35, the selected side mirror 21 is turned leftward and rightward in step S36. If the switch is the upper selection switch 18U or the lower selection switch 18D in step S35, an angle of the selected side mirror 21 is adjusted upward or downward in step S37. If the switch is the left selection switch 18L or the right selection switch 18R in step S35, the angle of the selected mirror 21 is adjusted leftward or rightward in step S38.

Figure 7:
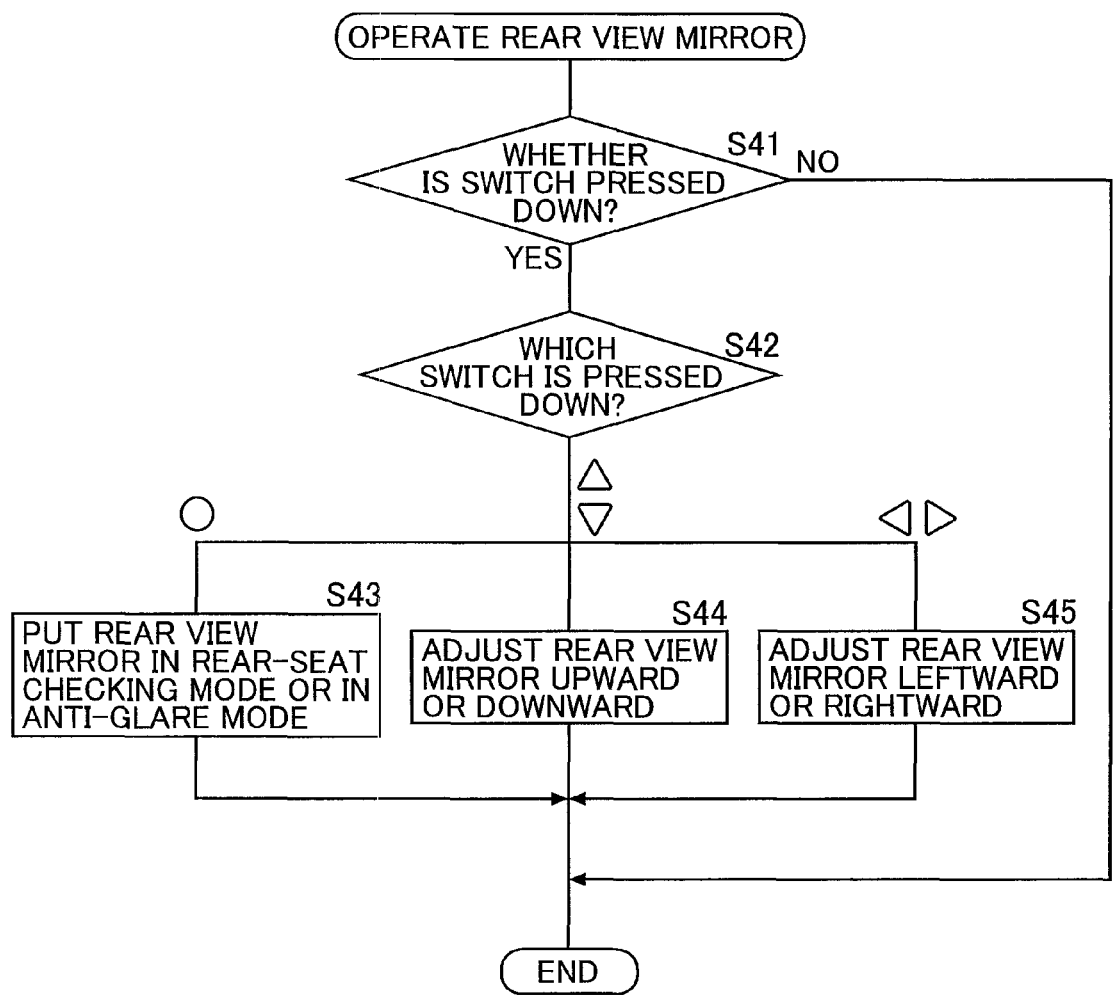
FIG. 7 is a flowchart of a sub-routine in step 27 of the flowchart in FIG. 5.

FIG. 7 shows a sub-routine (for operating the rear view mirror) of the step S27. When the occupant presses down the steering switch 16 in step S41, if the switch is the determination switch 17 in step S42, the rear view mirror 22 is put in a rear-seat checking mode or in an anti-glare mode in step S43. If the switch is the upper selection switch 18U or the lower selection switch 18D in step S42, an angle of the rear view mirror 22 is adjusted upward or downward in step S44. If the switch is the left selection switch 18L or the right selection switch 18R in step S42, the angle of the rear view mirror 22 is adjusted leftward or rightward.

Figure 8:
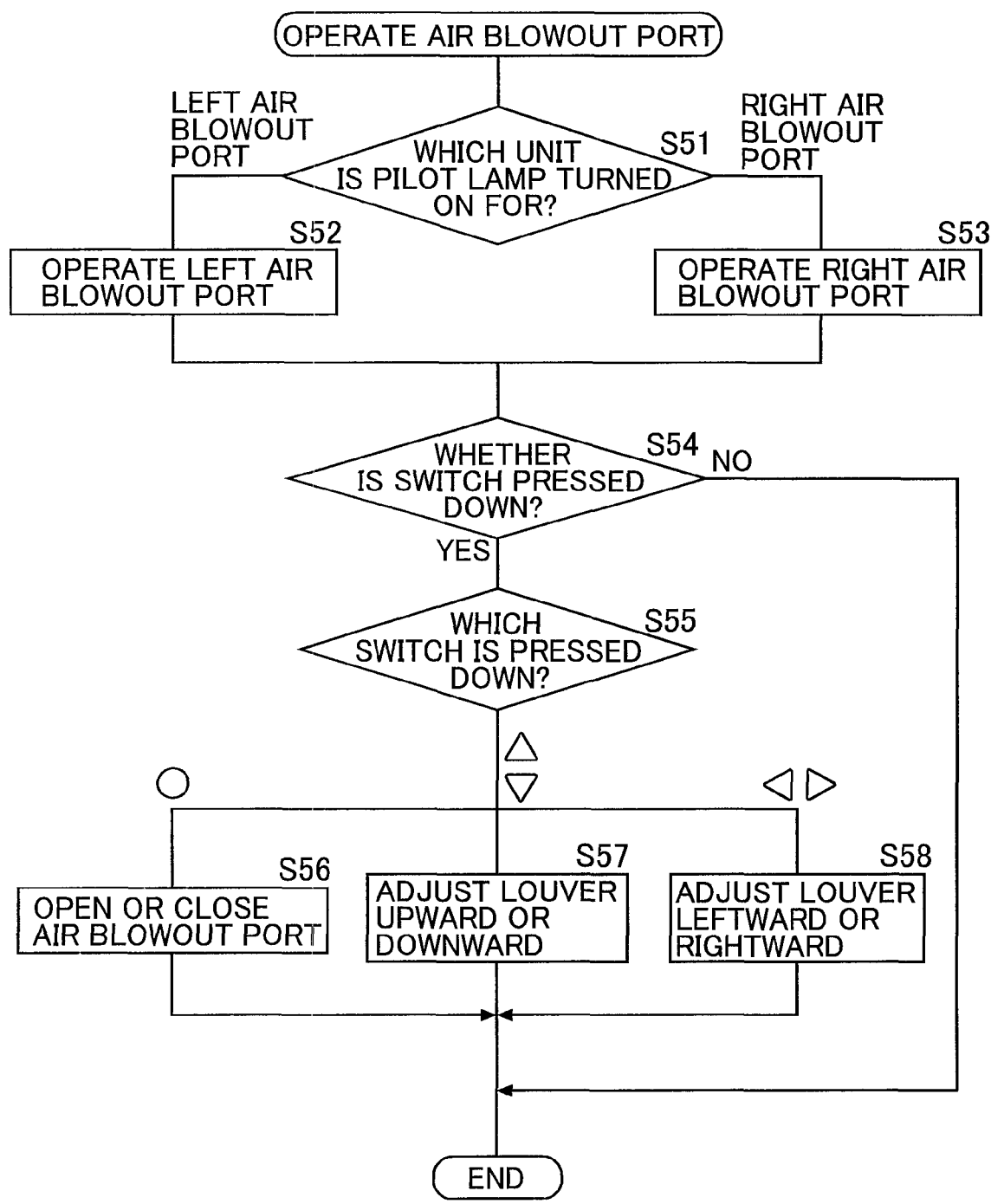
FIG. 8 is a flowchart of a sub-routine in step 26 of the flowchart in FIG. 5.

FIG. 8 shows a sub-routine (for operating the air blowout ports) of the step S26. If an onboard unit for which the pilot lamp is judged as being turned on in step S51 is the left air blowout port 25, the left air blowout port 25 becomes operable in step S52. If an onboard unit for which the pilot lamp is judged as being turned on in step S51 is the right air blowout port 25, the right air blowout port 25 becomes operable in step S53. When the occupant presses down the steering switch 16 in step S54, if the switch is the determination switch 17 in step S55, the selected air blowout port is opened or closed in step S56. If the switch is the upper selection switch 18U or the lower selection switch 18D in steps S55, an angle of the louver of the selected air blowout port 25 is adjusted upward or downward in step S57. If the switch is the left selection switch 18L or the right selection switch 18R in step S55, the angle of the louver of the selected air blowout port 25 is adjusted leftward or rightward in step S58.

Figure 9:
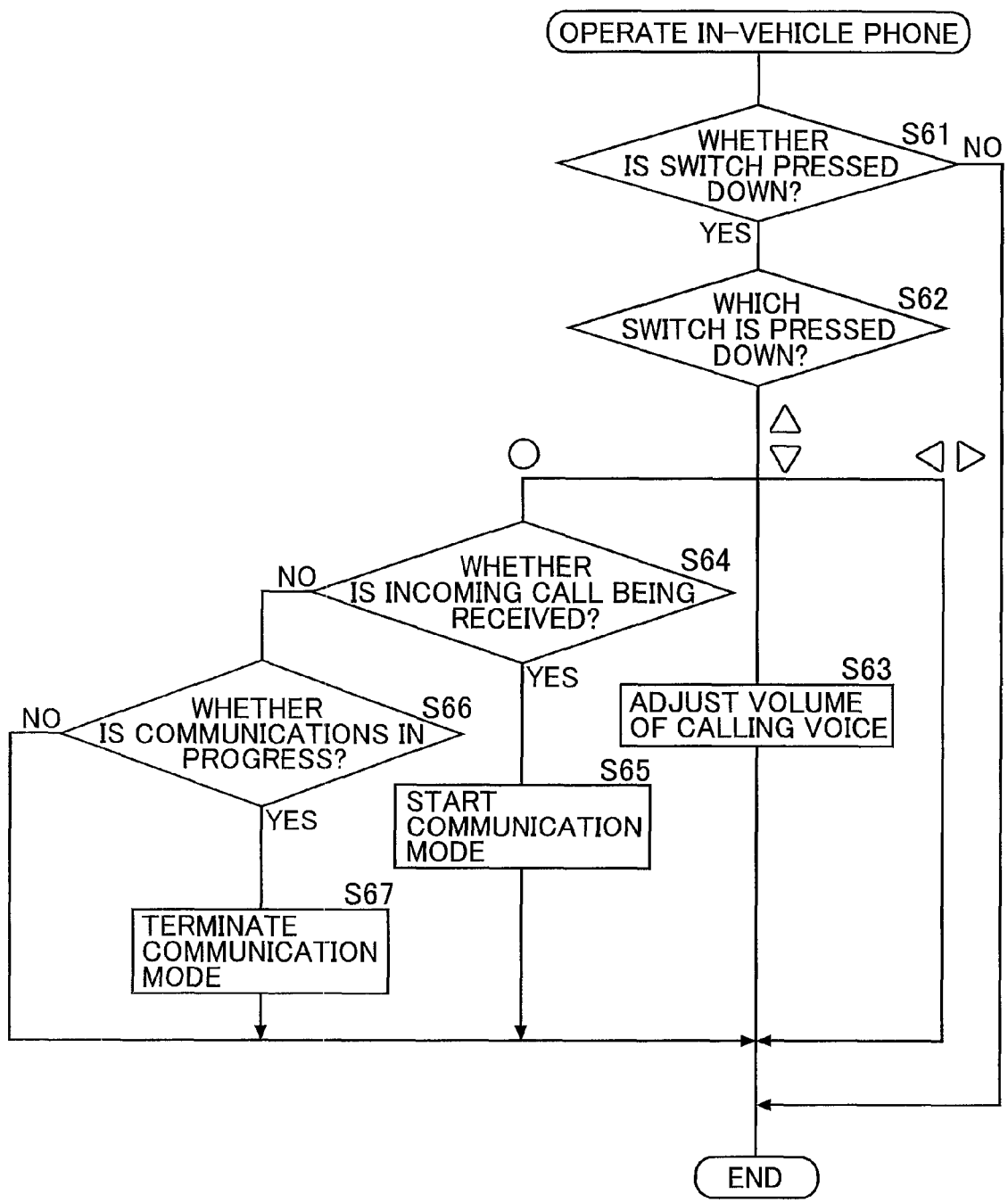
FIG. 9 is a flowchart of a sub-routine in step 25 of the flowchart in FIG. 5.

FIG. 9 shows a sub-routine (for operating the in-vehicle phone) of the step S25. When the occupant presses down the steering switch 16 in step S61, and if the switch is the upper selection switch 18U or the lower selection switch 18D in step S62, the volume of calling voice is adjusted in step S63. If the switch is the determination switch 17 in step S62, and concurrently if an incoming call is in the process of being received in step S64, the communication mode is started in step S65. If no incoming call is in the process of being received in step S64, and concurrently if communications are in progress in step S66, the communication mode is terminated in step S67.

Figure 10:
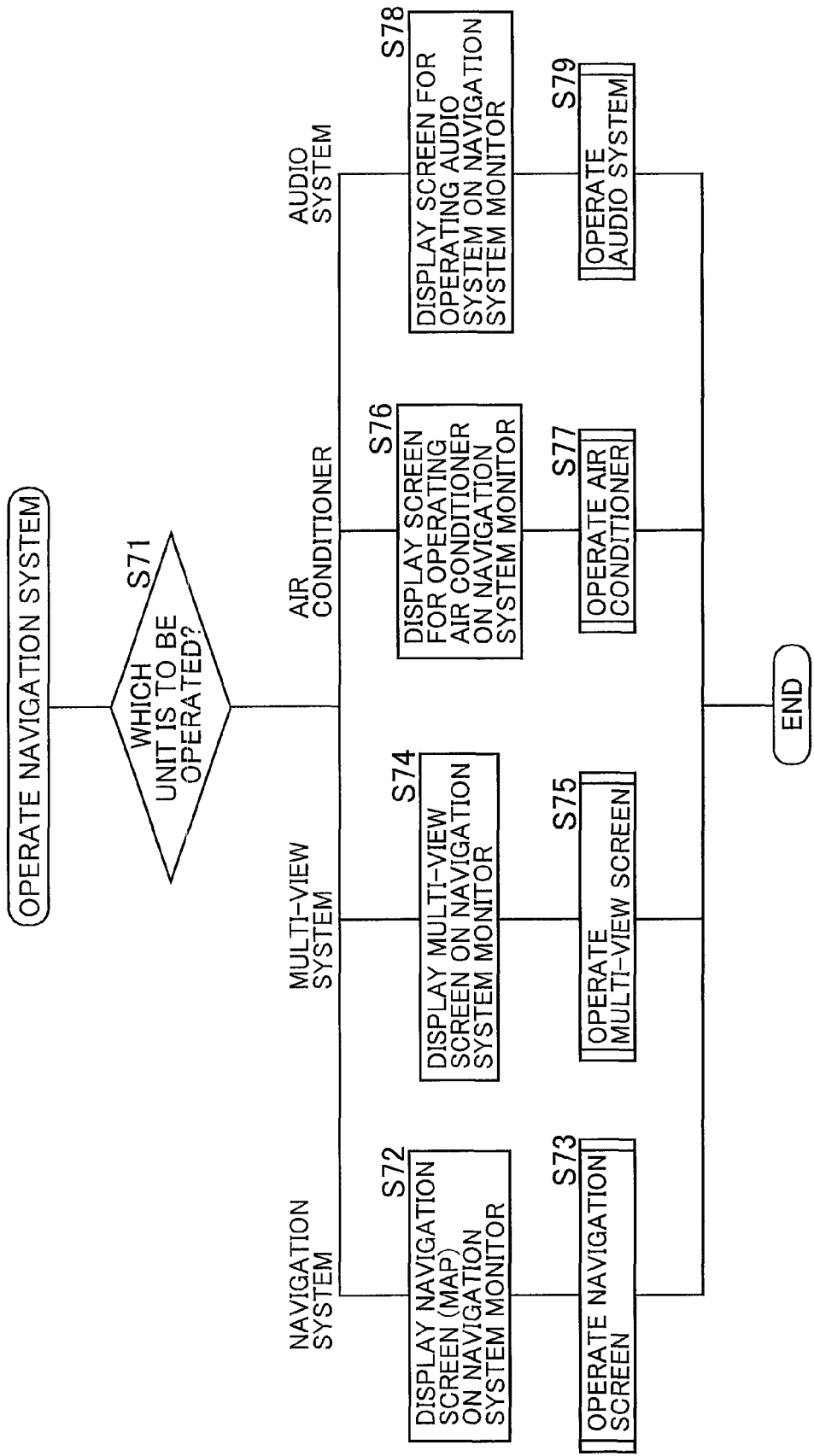
FIG. 10 is a flowchart of a sub-routine in step 23 of the flowchart in FIG. 5.

FIG. 10 shows a sub-routine (for operating the navigation system) of the step S23. If the unit to be operated is the navigation system 23 in step S71, a navigation system screen is displayed on a monitor in step S72, and the navigation system screen is operated in step S73. If the unit to be operated is a multi-view system in step S71, a multi-view screen is displayed on the monitor in step S74, and the multi-view screen is operated in step S75. If the unit to be operated is the air conditioner in step S71, a screen for operating the air conditioner is displayed on the monitor in step S76, and the air conditioner is operated in step S77. If the unit to be operated is an audio system in step S71, a screen for operating the audio system is displayed on the monitor in step S78, and the audio system is operated in step S79.

Figure 11:
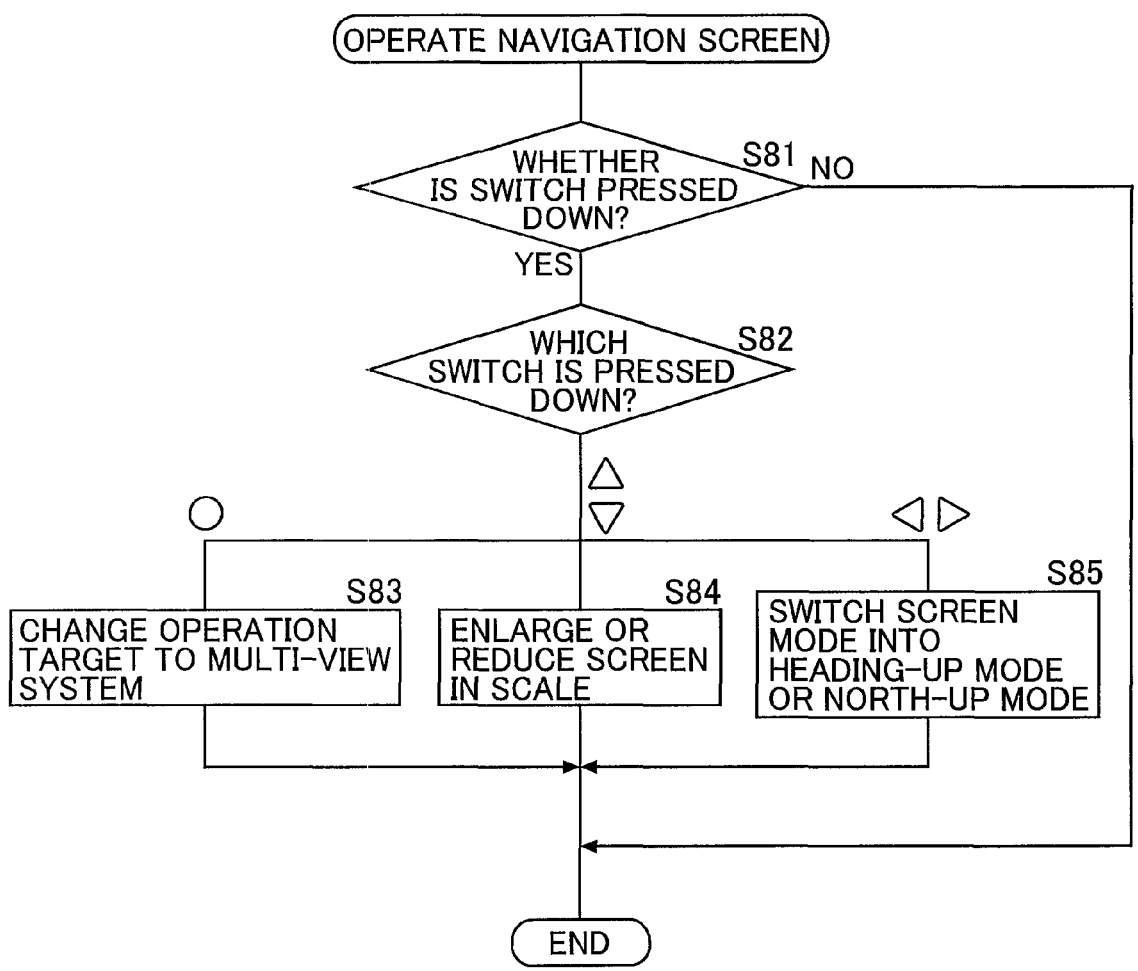
FIG. 11 is a flowchart of a sub-routine in step 73 of the flowchart in FIG. 10.

FIG. 11 shows a sub-routine (for operating the navigation system screen) of the step S73. When the occupant presses down the steering switch 16 in step S81, if the switch is the determination switch 17 in step S82, the unit to be operated is changed to the multi-view system in step S83. If the switch is the upper selection switch 18U or the lower selection switch 18D in step S82, the navigation system screen is enlarged or reduced in scale in step S84. If the switch is the left selection switch 18L or the right selection switch 18R in step S82, a mode of the navigation system screen is switch into a heading-up mode or in a north-up mode.

Figure 12:
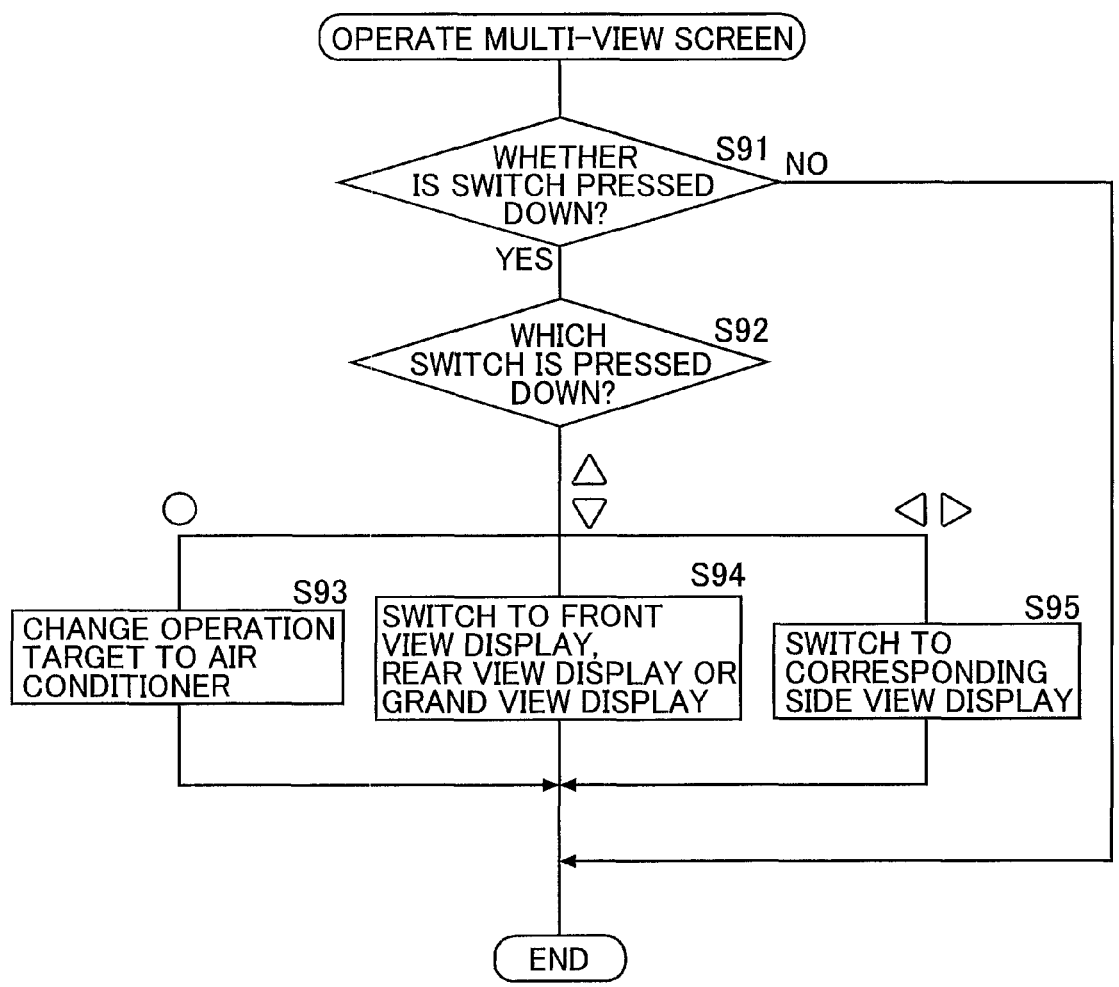
FIG. 12 is a flowchart of a sub-routine in step 75 of the flowchart in FIG. 10.

FIG. 12 shows a sub-routine (for operating the multi-view screen) of the step 75. When the occupant presses down the steering switch 16 in step S91, if the switch is the determination switch 17 in step S92, the unit to be operated is changed to the air conditioner in step S93. If the switch is the upper selection switch 18U or the lower selection switch 18D in step S92, the multi-view screen is switched to a front view screen, a rear view screen or a grand view screen in step S94. If the switch is the left selection switch 18L or the right selection switch 18R in step S92, the multi-view screen is switched to a side view screen in step S95.

Figure 13:
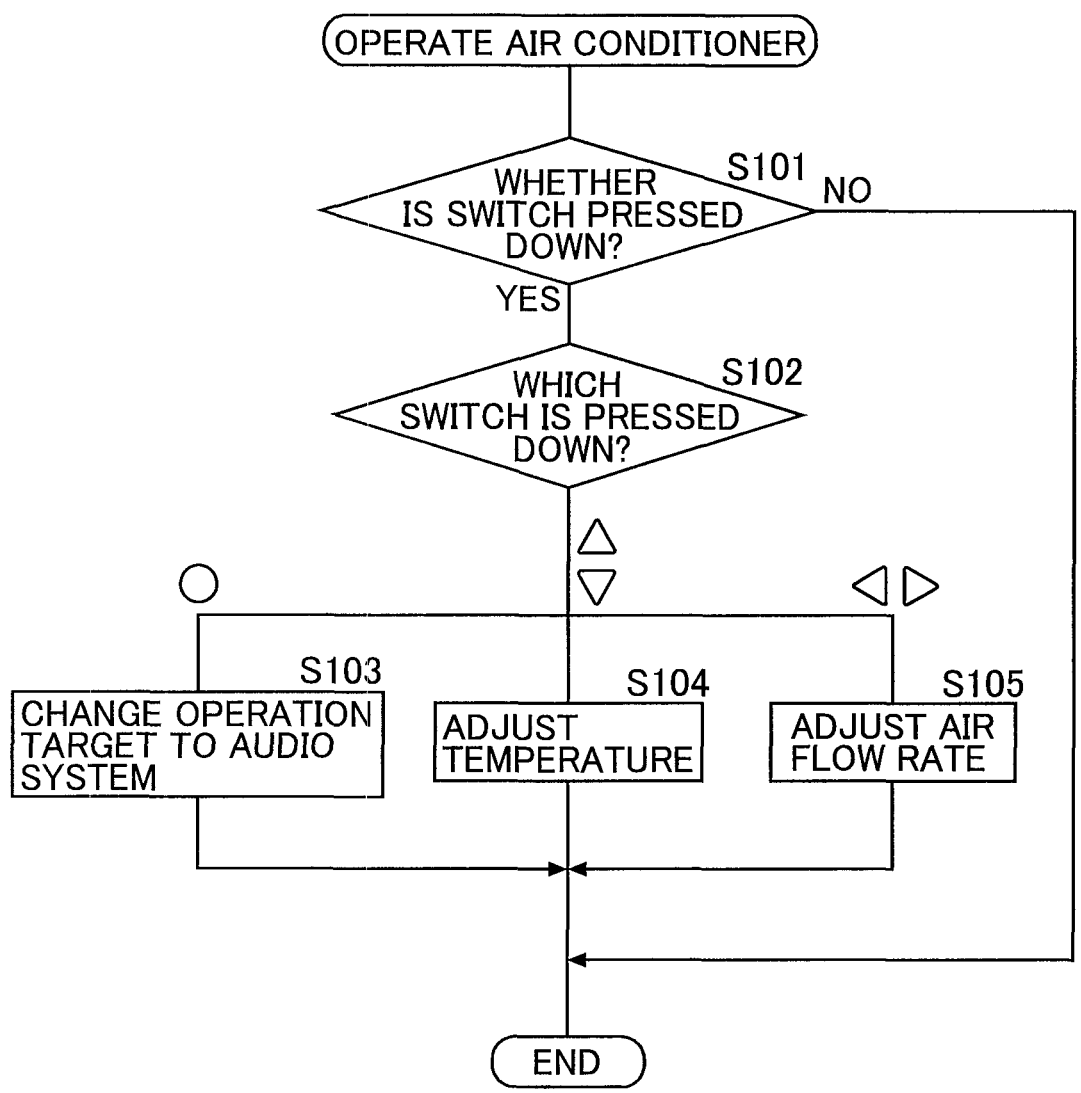
FIG. 13 is a flowchart of a sub-routine in step 77 of the flowchart in FIG. 10.

FIG. 13 shows a sub-routine (for operating the air conditioner) of the step S77. When the occupant presses down the steering switch 16 in step S101, if the switch is the determination switch 17 in step S102, the unit to be operated is changed to the audio system in step S103. If the switch is the upper selection switch 18U or the lower selection switch 18D in step S102, the temperature is adjusted in step S104. If the switch is the left selection switch 18L or the right selection switch 18R in step S102, the air flow rate is adjusted in step S105.

Figure 14:
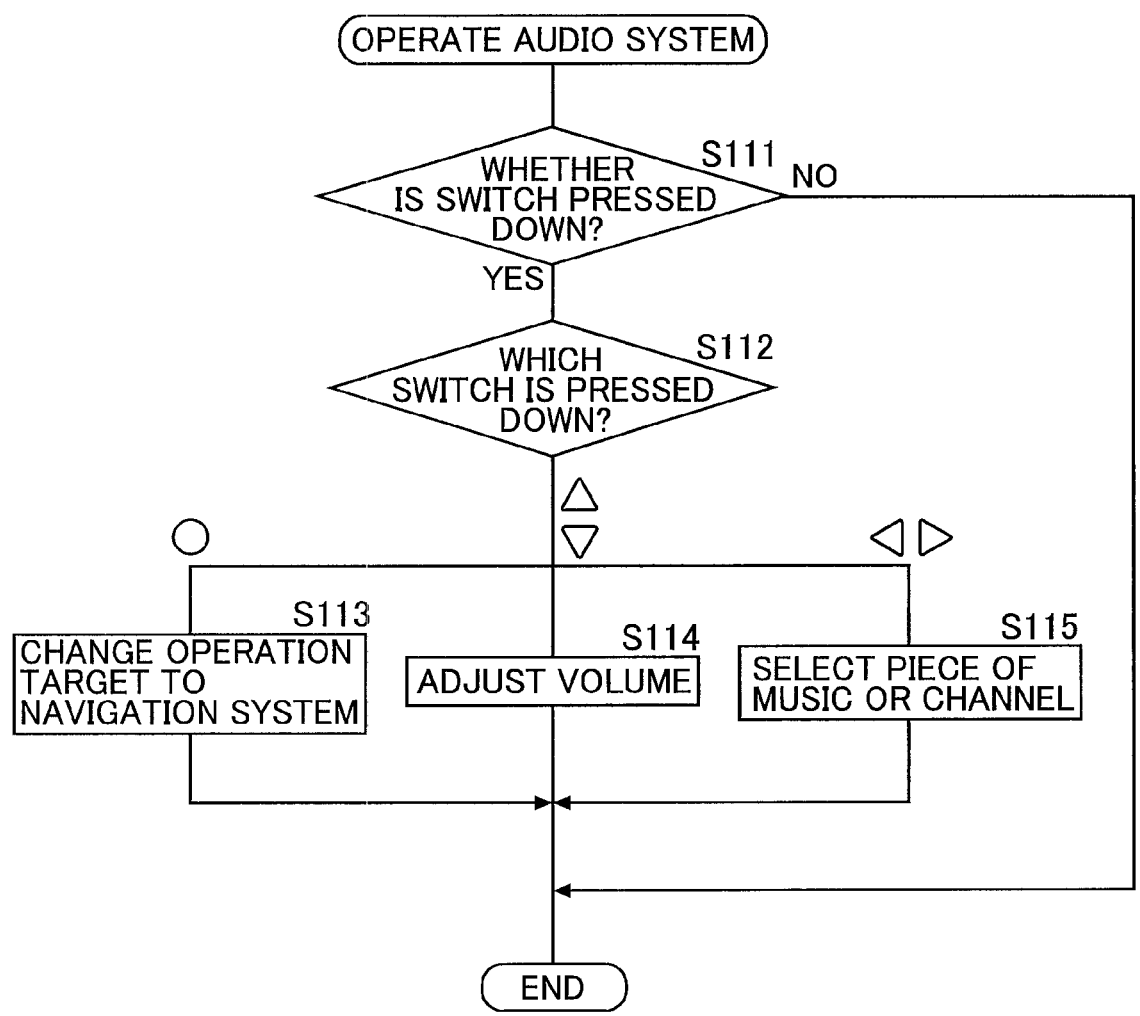
FIG. 14 is a flowchart of a sub-routine in step 79 of the flowchart in FIG. 10.

FIG. 14 shows a sub-routine (for operating the audio system) of the step S79. When the occupant presses down the steering switch 16 in step S111, if the switch is the determination switch 16 in step S112, the unit to be operated is changed to the navigation system in step S113. If the switch is the upper selection switch 18U or the lower selection switch 18D in step S112, the volume is adjusted in step S114. If the switch is the left selection switch 18L or the right selection switch 18R in step S112, a piece of music or a channel is selected in step S115.

Figure 15:
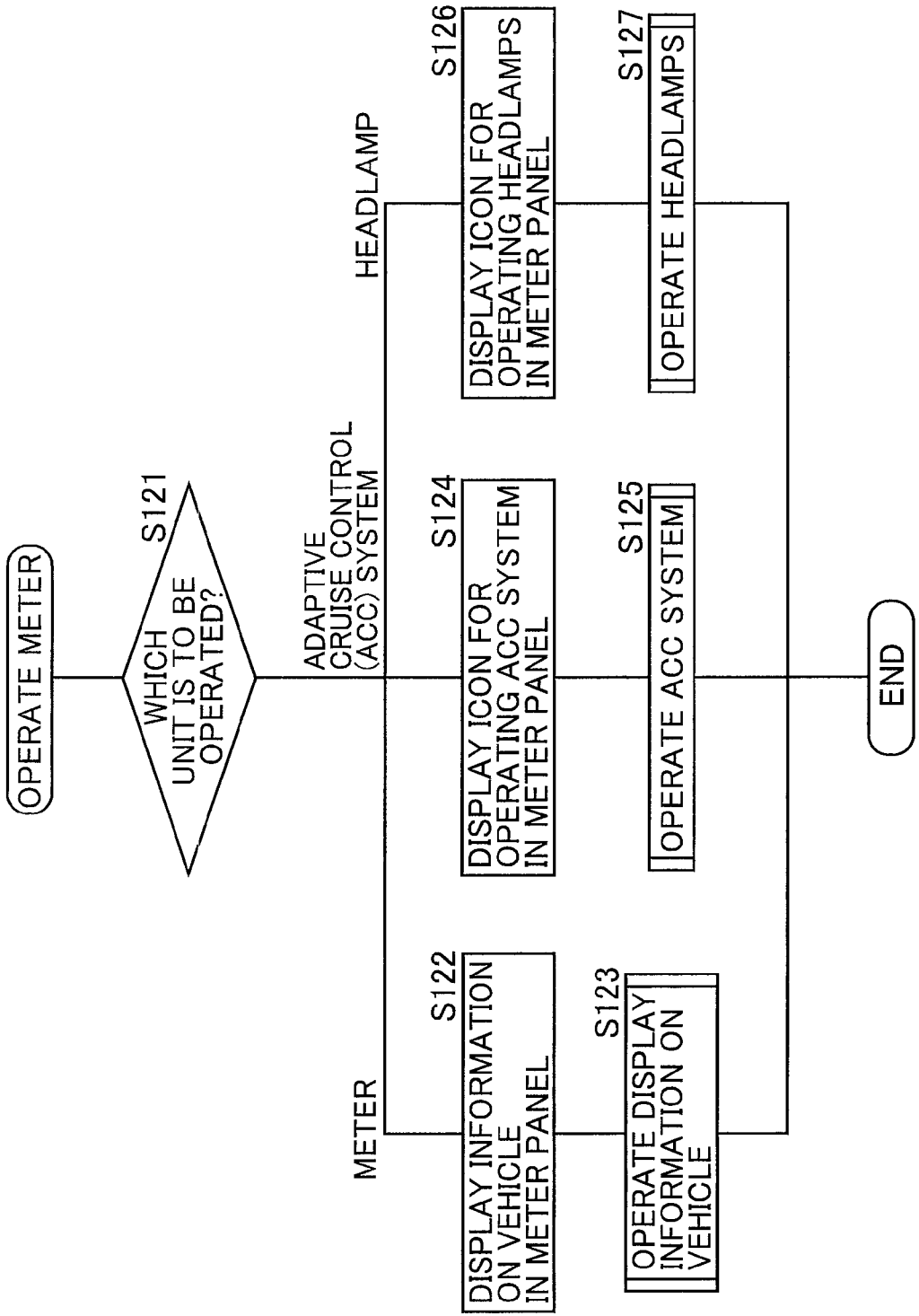
FIG. 15 is a flowchart of a sub-routine in step 24 of the flowchart in FIG. 5.

FIG. 15 shows a sub-routine (for operating the meter panel) of the step S24. If the unit to be operated is the meter panel 26 in step S121, information on the vehicle is displayed on the meter panel 26 in step S122, and the display of the information on the vehicle is operated in step S123. If the unit to be operated is an ACC (adaptive cruise control) system in step S121, an icon for operating the ACC system is displayed on the meter panel 26 in step S124, and the ACC system is controlled in step S125. If the unit to be operated is the headlamps in step S121, an icon for operating the headlamps is displayed on the meter panel 26 in step S126, and the headlamps are operated in step S127.

Figure 16:
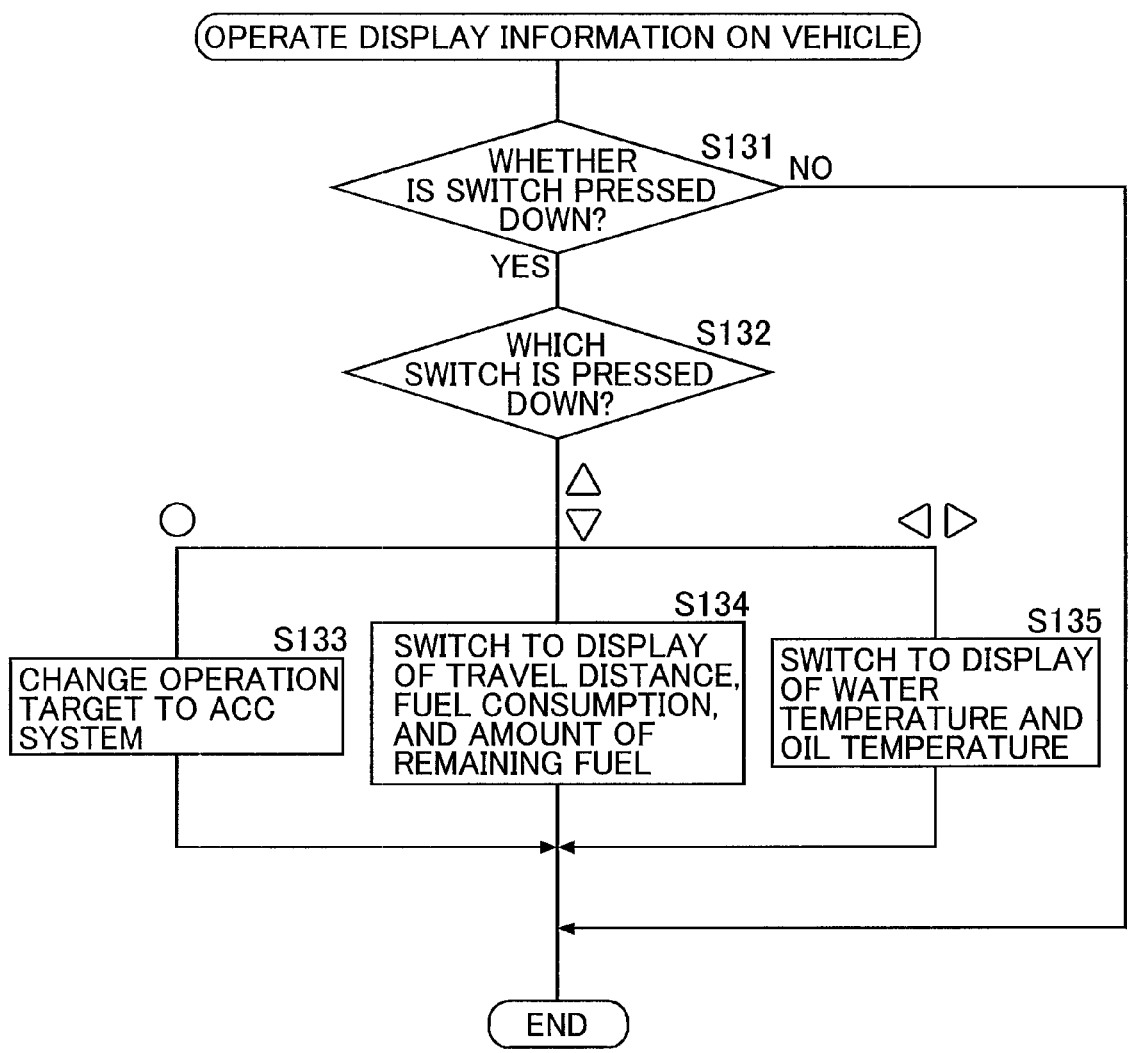
FIG. 16 is a flowchart of a sub-routine in step 123 of the flowchart in FIG. 15.

FIG. 16 is a sub-routine (for operating the display of the information on the vehicle) of the step S123. When the occupant presses down the steering switch 16 in step S131, if the switch is the determination switch 17 in step S132, the unit to be operated is changed to the ACC system in step S133. If the switch is the upper selection switch 18U or the lower selection switch 18D in step S132, the display of the information on the vehicle is switched to the display of the travel distance, the fuel consumption and the amount of remaining fuel in step S134. If the switch is the left selection switch 18L or the right selection switch 18R in step S132, the display of the information on the vehicle is switched to the display of the water temperature or the oil temperature in step S135.

Figure 17:
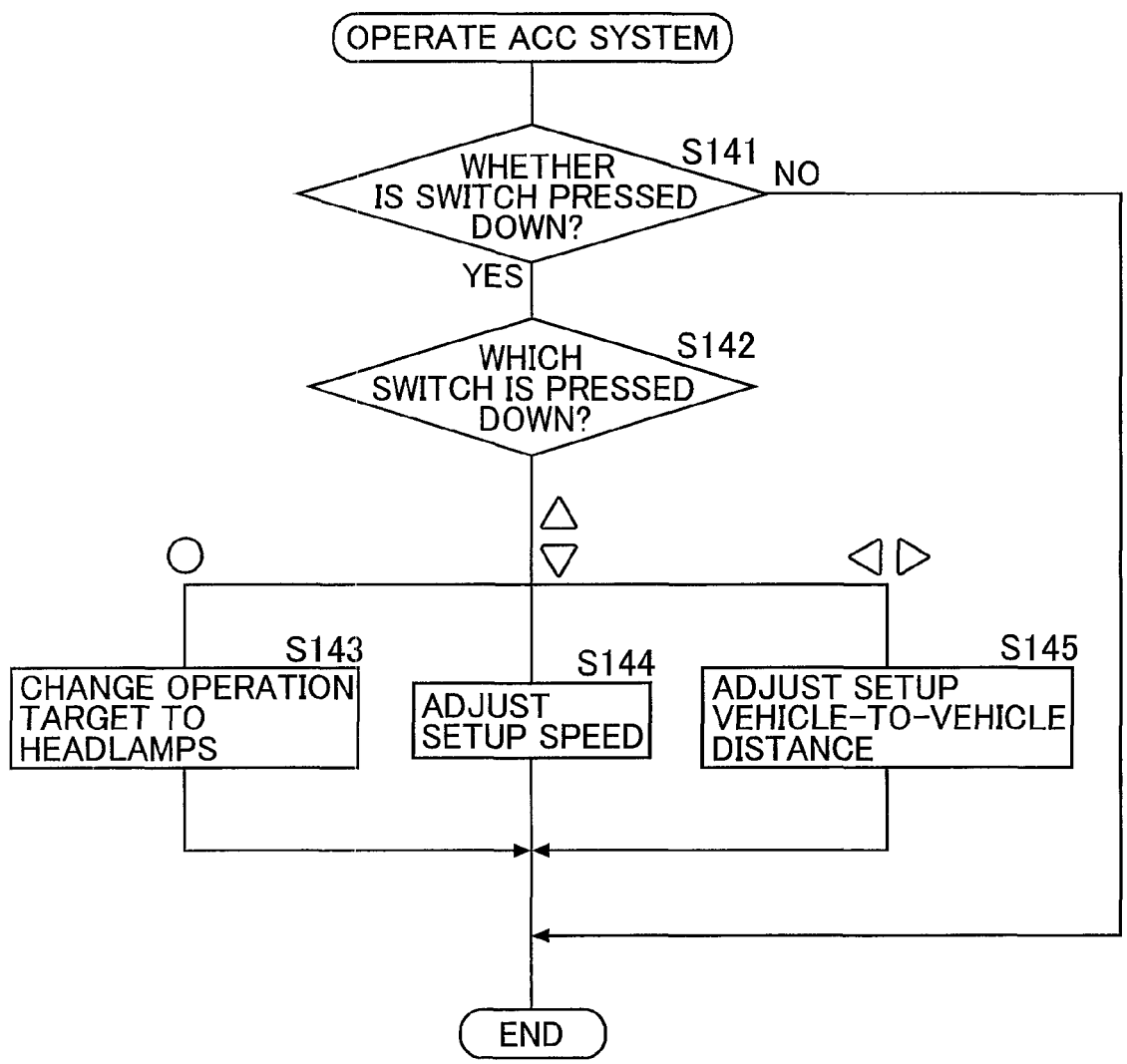
FIG. 17 is a flowchart of a sub-routine in step 125 of the flowchart in FIG. 15.

FIG. 17 shows a sub-routine (for operating the ACC system) of the step S125. When the occupant presses down the steering switch 16 in step S141, if the switch is the determination switch 17 in step S142, the unit to be operated is changed to the headlamps in step S143. If the switch is the upper selection switch 18U or the lower selection switch 18D in step S142, the setup speed is adjusted in step S144. If the switch is the left selection switch 18L or the right selection switch 18R in step S142, the setup vehicle-to-vehicle distance is adjusted in step S145.

Figure 18:
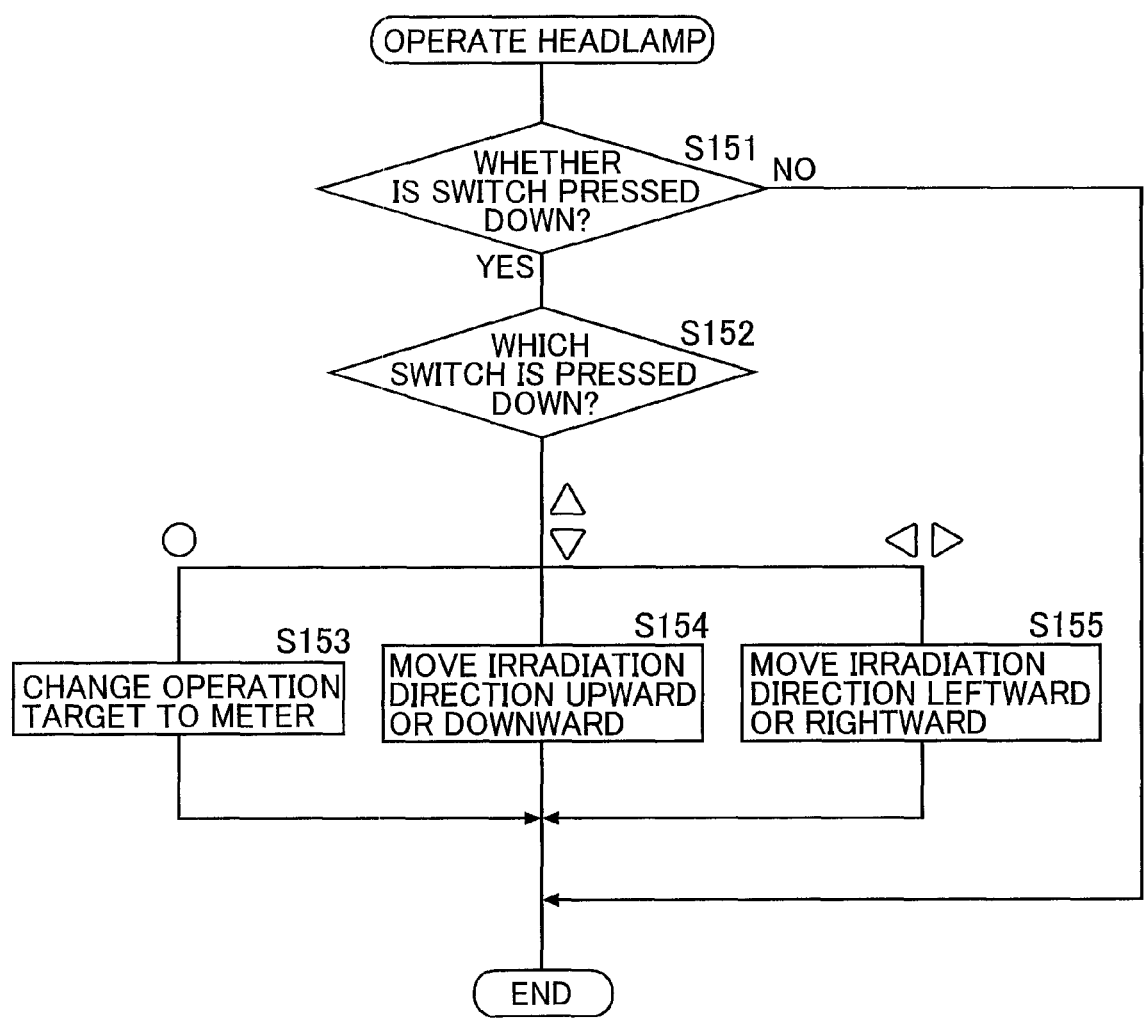
FIG. 18 is a flowchart of a sub-routine in step 127 of the flowchart in FIG. 15.

FIG. 18 shows a sub-routine (for operating the headlamps) of the step S127. When the occupant presses down the steering switch 16 in step S151, if the switch is the determination switch 17 in step S152, the unit to be operated is changed to the meter panel 26 in step S153. If the switch is the upper selection switch 18U or the lower selection switch 18D in step S152, the irradiation direction of the headlamps is adjusted upward or downward in step 154. If the switch is the left selection switch 18L or the right selection switch 18R in step S152, the irradiation direction of the headlamps is adjusted leftward or rightward in step S155.

TABLE 1

| | OPERATION SWITCH TYPE | | |
|---|---|---|---|
| UNIT TO BE LOOKED AT | ○ (DETERMINATION) | (UPPER OR LOWER SELECTION) | ◁ ▷(RIGHT OR LEFT SELECTION) |
| SIDE MIRROR | TURN SIDE MIRROR LEFTWARD AND RIGHTWARD ONE TIME | ADJUST SIDE MIRROR UPWARD OR DOWNWARD | ADJUST SIDE MIRROR LEFTWARD OR RIGHTWARD |
| NAVIGATION SYSTEM | SWITCH UNITS | NAVIGATION SCREEN (MAP) | ENLARGE OR REDUCE SCREEN IN SCALE | SWITCH SCREEN MODE INTO HEADING-UP MODE OR NORTH-UP MODE |
| | | MULTI-VIEW SCREEN | SWITCH DISPLAY IMAGE | |
| | | AIR CONDITIONER | ADJUST TEMPERATURE | ADJUST AIR FLOW RATE |
| | | AUDIO SYSTEM | ADJUST VOLUME | SELECT PIECE OF MUSIC |
| METER PANEL | SWITCH UNITS | DISPLAY MEASUREMENT | SWITCH DISPLAY (FUEL CONSUMPTION, TRAVEL DISTANCE, AMOUNT OF REMAINING FUEL, OIL TEMPERATURE, AND WATER TEMPERATURE) | |
| | | ADAPTIVE CRUISE CONTROL (ACC) SYSTEM | ADJUST SPEED | ADJUST VEHICLE-TO-VEHICLE DISTANCE |
| | | HEADLAMP | MOVE IRRADIATION DIRECTION UPWARD OR DOWNWARD | MOVE IRRADIATION DIRECTION LEFTWARD OR RIGHTWARD |
| IN-VEHICLE PHONE | TELEPHONE | ADJUST VOLUME | — |

TABLE 1-continued

| | | OPERATION SWITCH TYPE | |
|---|---|---|---|
| UNIT TO BE LOOKED AT | ○ (DETERMINATION) | ⇅(UPPER OR LOWER SELECTION) | ◁ ▷(RIGHT OR LEFT SELECTION) |
| AIR BLOWOUT PORT | COMMUNICATION OPEN OR CLOSE BLOWOUT PORT | ADJUST LOUVER UPWARD OR DOWNWARD | ADJUST LOUVER LEFTWARD OR RIGHTWARD |
| REAR VIEW MIRROR | PUT REAR VIEW MIRROR IN REAR-SEAT CHECKING MODE OR IN ANTI-GLARE MODE | ADJUST REAR VIEW MIRROR UPWARD OR DOWNWARD | ADJUST REAR VIEW MIRROR LEFTWARD OR RIGHTWARD |

Table 1 summarizes the scheme of the operations of the various onboard units by the determination switch 17 as well as the upper, lower, leftward and rightward selection switches 18U, 18D, 18L, 18R of the steering switch 16.

As described above, the present embodiment enables the movement of the occupant's sight line L to select one of the multiple onboard units including the side mirrors 21, the rear view mirror 22, the navigation system 23, the in-vehicle phone 24, the air blowout ports 25 and the meter panel 26. Thus, the present embodiment not only reduces the occupant's operation load in comparison with any manual selection, but also allows the multiple onboard units to be operated by use of the single common steering switch 16. Accordingly, the present embodiment can reduce the number of installation spaces and component parts, and enhance the operability.

Furthermore, because this embodiment informs the occupant that an onboard unit to which the occupant's sight line is directed can be operated by lighting the corresponding pilot lamp, the occupant can reliably recognize which onboard unit can be operated. Additionally, for example, even when the onboard units are arranged close to one another as in the case of the navigation system 23 and the in-vehicle phone 24, the present embodiment can prevent the wrong operation caused by the wrong recognition of the operable onboard unit.

Moreover, because the steering switch 16 is mounted on the steering wheel 12, the occupant can operate any one of the onboard units without releasing the hands from the steering wheel 12. This enhances the convenience.

Next, descriptions will be provided for a second embodiment of the present invention.

The second embodiment is the onboard unit controlling apparatus which employs the vehicle speed detector 19 (see FIG. 2). While the vehicle speed detector 19 is detecting that the vehicle is running, if any one of the onboard units continues to be operable (or any one of the pilot lamps continues to be on) longer than a predetermined time, there is a risk that: the sight line L of the occupant may have been cast on the onboard unit for a long time; and the occupant may pay insufficient attention to the front view.

With this taken into consideration, once the predetermined time has passed, the second embodiment switches the onboard unit from an operable state to an inoperable state, and concurrently switches the pilot lamp from on to flashing or off. Thereby, the second embodiment notifies or informs the occupant that the onboard unit is inoperable. This enables the occupant to return the sight line L to the front view and to continue safe driving.

Although the foregoing descriptions have been provided for the embodiments of the present invention, various design modifications can be made to the present invention within a scope not departing from the gist of the present invention.

For example, the structure of the sight line detector 15 is not limited to the structure according to the embodiments. A sight line detector with an arbitrary structure may be used instead.

In addition, the onboard units according to the present invention are not limited to the side mirrors 21, the rear view mirror 22, the navigation system 23, the in-vehicle phone 24, the air blowout port 25 or the meter panel 26 according to the embodiments.

Furthermore, the notifying devices according to the present invention are not limited to the pilot lamps according to the embodiments. Voice messages such as "Left side mirror is now operable" may be used instead.

Moreover, although the present invention uses the steering switch 16 which is installed in the steering wheel 12, the location in which the switch is installed is chosen arbitrarily.

What is claimed is:

1. An onboard unit controlling apparatus including:
a plurality of onboard units operable by an occupant;
a sight line detector configured to detect a sight line of the occupant;
a controller configured such that, when the sight line of the occupant detected by the sight line detector is directed to any one of the plurality of onboard units, the controller turns the onboard unit, to which the sight line is directed, into an operable state;
a notifying device configured such that, when the controller judges that the onboard unit, to which the sight line is directed, is operable, the notifying device notifies the occupant of the onboard unit; and
a run judging device that is configured to judge whether a vehicle is running, wherein
when any one of the onboard units is continuously operable for a predetermined time or longer and if the run judging device judges that the vehicle is running, the controller releases the one of the onboard units from the operable state, and concurrently operates the notifying device in a mode different from a mode in the operable state.

2. The onboard unit controlling apparatus according to claim 1, wherein
the notifying device includes luminous bodies, each of said luminous bodies being provided to a corresponding one of the onboard units and being configured to emit light when the corresponding onboard unit is operable,
when the controller judges that the onboard unit, to which the sight line is directed, is operable, one of the luminous bodies which corresponds to the onboard unit to which the sight line is directed is kept in on state; and
when any one of the onboard units is continuously operable for said predetermined time or longer and if the run judging device judges that the vehicle is running, the controller releases the one of the onboard units from the operable state, and concurrently switches the one of the luminous bodies from the on state to a flashing state for notifying the occupant that one of the onboard units is placed in an inoperable state.

3. The onboard unit controlling apparatus according to claim 2,
the operable onboard unit is controlled by a steering switch installed in a steering wheel, and
a function of the steering switch is switched depending on the operable onboard unit.

4. The onboard unit controlling apparatus according to claim 1,
the operable onboard unit is controlled by a steering switch installed in a steering wheel, and
a function of the steering switch is switched depending on the operable onboard unit.

5. The onboard unit controlling apparatus according to claim 1, wherein
one onboard unit of the plurality of the onboard units is a navigation system.

6. The onboard unit controlling apparatus according to claim 1, wherein
the onboard units include an in-vehicle phone operable by the occupant.

7. The onboard unit controlling apparatus according to claim 1, wherein
the onboard units include an air blowout port of an air conditioner operable by the occupant.

8. The onboard unit controlling apparatus according to claim 1, wherein
the onboard units include a meter panel operable by the occupant.

9. The onboard unit controlling apparatus according to claim 1, wherein
the onboard units include a rear view mirror operable by the occupant.

10. The onboard unit controlling apparatus according to claim 1, wherein
the onboard units include a side mirror operable by the occupant.

* * * * *